(12) United States Patent
Hornby

(10) Patent No.: US 8,317,157 B2
(45) Date of Patent: *Nov. 27, 2012

(54) AUTOMOBILE HIGH PRESSURE PUMP SOLENOID VALVE

(75) Inventor: Michael J. Hornby, Williamsburg, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 816 days.

This patent is subject to a terminal disclaimer.

(21) Appl. No.: 12/314,638

(22) Filed: Dec. 15, 2008

(65) Prior Publication Data

US 2010/0148103 A1    Jun. 17, 2010

(51) Int. Cl.
F16K 31/02 (2006.01)

(52) U.S. Cl. .............. 251/129.18; 251/337; 123/446

(58) Field of Classification Search .............. 417/505; 251/129.15, 337, 129.18; 123/446, 457
See application file for complete search history.

(56) References Cited

U.S. PATENT DOCUMENTS

| | | | | |
|---|---|---|---|---|
| 2,108,979 A | * | 2/1938 | Wile | 251/50 |
| 3,712,581 A | * | 1/1973 | Parlow | 251/129.15 |
| 3,851,285 A | * | 11/1974 | Rothfuss et al. | 335/262 |
| 4,529,166 A | * | 7/1985 | Klausen et al. | 251/129.02 |
| 5,284,317 A | * | 2/1994 | Brehm et al. | 251/129.08 |
| 5,606,991 A | * | 3/1997 | Kuribayashi | 137/510 |
| 6,446,610 B1 | | 9/2002 | Mazet | |
| 7,009,478 B2 | * | 3/2006 | Ermert et al. | 335/220 |
| 7,121,263 B2 | | 10/2006 | Eser | |
| 7,240,666 B2 | | 7/2007 | Okamoto | |
| 2001/0048091 A1 | * | 12/2001 | Enomoto et al. | 251/129.15 |
| 2004/0021111 A1 | * | 2/2004 | VanWeelden et al. | 251/129.15 |
| 2005/0196308 A1 | * | 9/2005 | Schmid | 417/505 |
| 2005/0199846 A1 | * | 9/2005 | Kim et al. | 251/129.15 |
| 2006/0150932 A1 | * | 7/2006 | Naber et al. | 123/90.11 |
| 2006/0218953 A1 | * | 10/2006 | Hirota | 62/228.5 |
| 2010/0111734 A1 | * | 5/2010 | Usui et al. | 417/505 |
| 2010/0147266 A1 | * | 6/2010 | Crispen | 123/446 |
| 2010/0252763 A1 | * | 10/2010 | Courth et al. | 251/129.15 |
| 2010/0288953 A1 | * | 11/2010 | Czimmek et al. | 251/129.15 |

FOREIGN PATENT DOCUMENTS

EP    1701031 A1 *  9/2006

* cited by examiner

Primary Examiner — John K Fristoe, Jr.
Assistant Examiner — R. K. Arundale

(57) ABSTRACT

A module solenoid valve (14) includes a valve body (16) defining an inlet opening (22) and an outlet opening (20). The valve body includes a seating surface (18) at a distal end thereof. A valve member (24) controls flow of fuel through the outlet opening. A movable armature (26) is coupled with the valve member such that movement of the armature moves the valve member between a closed position and an open position. A stator (38) is associated with the armature. A first spring (32) biases the armature and thus the valve member to the closed position. A cover (28) is coupled to the stator. A second spring 34 is between the cover and the armature to provide a biasing force on the armature. An electromagnetic coil (36) is associated with the stator and armature for causing movement of the armature towards the stator.

19 Claims, 2 Drawing Sheets

AUTOMOBILE HIGH PRESSURE PUMP SOLENOID VALVE

TECHNICAL FIELD

The present disclosure relates to a direct injection high pressure pumps for automobiles and, more particularly, to an on-off valve for the pump inlet.

BACKGROUND

In today's automotive engine systems, there is an increased demand for low cost, direct injection. In common rail injection systems, the fuel is delivered by means of a high pressure pump from a fuel tank to a fuel rail which serves as a storage reservoir for the fuel. The fuel is under high pressure in the fuel rail and can be injected directly into the cylinders via injection valves connected to the rail.

Current direct injection high pressure pump valves are calibrated based on tolerances which can be inaccurate. In addition, with the conventional valve construction, if a faulty valve is discovered during manufacturing, the entire valve may need to be reworked or scrapped.

SUMMARY

There is a need to provide a solenoid valve for a direct injection high pressure pump for an automobile that is of modular configuration, uses fuel injector technology, and an has improved calibration technique.

An object of the invention is to fulfill the need referred to above. In accordance with the principles of the present invention, this objective is achieved by providing a module solenoid valve for a direct injection, high pressure pump of an automobile fuel delivery system. The solenoid valve includes a valve body defining an inlet opening and an outlet opening in communication with the inlet opening. The valve body includes a seating surface at a distal end thereof. A valve member is at least partially disposed in the valve body. The valve member has a sealing surface associated with the seating surface. A movable armature is coupled with the valve member such that movement of the armature moves the valve member between a closed position with the sealing surface engaging the seating surface to prevent fuel from passing through the outlet opening, and an open position with at least a portion of the valve member moving outwardly from the distal end of valve body with the sealing surface being disengaged from the seating surface to permit fuel to pass through the outlet opening. A stator is associated with the armature. A first spring is constructed and arranged to bias the armature and thus the valve member to the closed position. A cover is coupled to the stator. A second spring is provided between the cover and the armature and is constructed and arranged to provide a biasing force on the armature. The cover is constructed and arranged to adjust the biasing force. An electromagnetic coil is associated with the stator and armature for causing movement of the armature towards the stator.

In accordance with another aspect of an embodiment, the invention, a method of assembling a module solenoid valve provides a fuel module having a valve body defining an inlet opening and an outlet opening in communication with the inlet opening. The valve body includes a seating surface at a distal end thereof. A valve member is at least partially disposed in the valve body. The valve member has a sealing surface associated with the seating surface. A movable armature is coupled with the valve member such that movement of the armature moves the valve member between a closed position with the sealing surface engaging the seating surface to prevent fuel from passing through the outlet opening, and an open position with at least a portion of the valve member moving outwardly from the distal end of valve body with the sealing surface being disengaged from the seating surface to permit fuel to pass through the outlet opening. A stator is associated with the armature. A first spring is constructed and arranged to bias the armature and thus the valve member to the closed position. A cover is coupled to the stator. A second spring is provided between the cover and the armature and is constructed and arranged to provide a biasing force on the armature. The cover is constructed and arranged to adjust the biasing force. The method couples a power assembly, separate from the fuel module, to the fuel module. The power assembly includes an electromagnetic coil associated with the armature and stator for causing movement of the armature towards the stator, and a connector for powering the electromagnetic coil.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXAMPLE EMBODIMENTS

Figure 1:
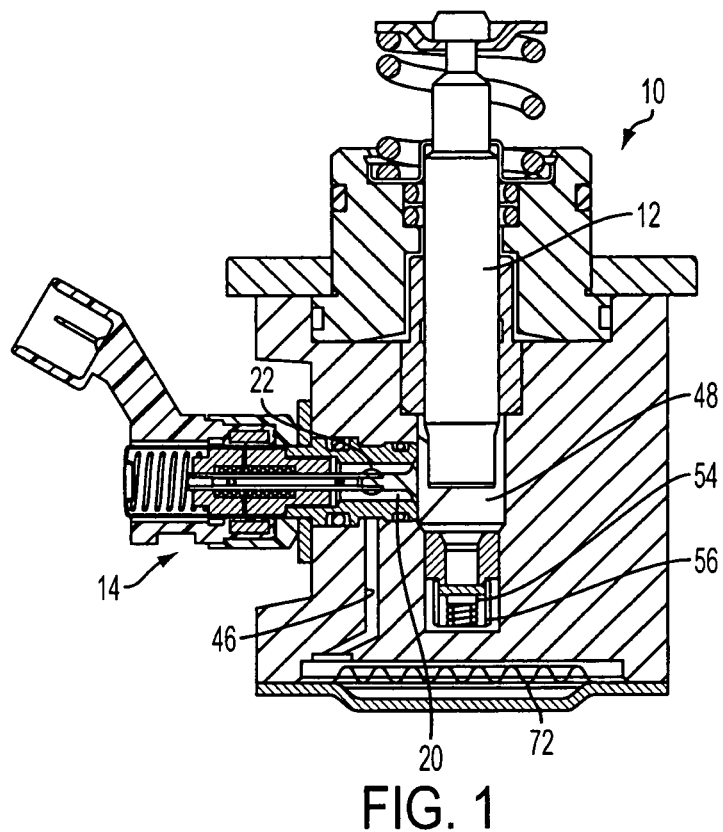
FIG. 1 is sectional view of a direct injection, high pressure pump having an on-off solenoid valve provided in accordance with an example embodiment of the present invention.

Referring to FIG. 1, a direct injection, high pressure pump is shown, generally indicated at 10, in accordance with an example embodiment of the present invention. The pump 10 is preferably of the conventional single-piston type having a piston 12 that that is associated with a camshaft to bring fuel to the required high pressure levels.

Figure 2:
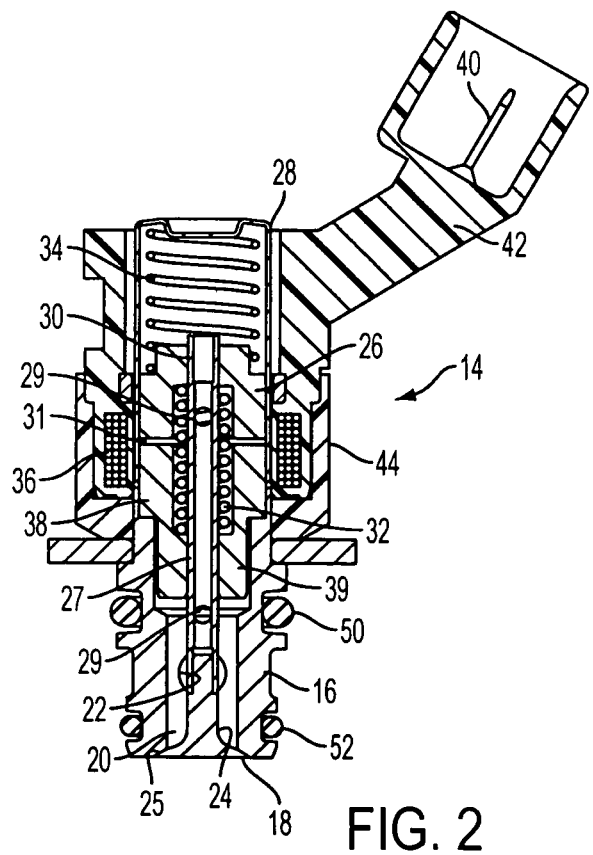
FIG. 2 is an enlarged sectional view of the solenoid valve of FIG. 1.

The pump 10 includes a module solenoid valve, generally indicated at 14. With reference to FIG. 2, the solenoid valve 14 includes a body 16 having a valve seating surface 18. The seating surface 18 surrounds a fuel outlet opening 20 that is in communication with an inlet opening 22 in the body 16. In the embodiment, the inlet opening 22 is generally transverse with respect to the outlet opening 20.

A valve member 24, as a means for controlling flow, is moveable within the body 16 between a first, seated or closed position and a second, open position. In the closed position, a sealing surface 25 of the valve member 24 is urged against the seating surface 18 to close the outlet opening 20 against fuel flow. In the open position, the valve member 24 and thus sealing surface 25 is spaced outwardly from the seating surface 18 to allow fuel flow through the outlet opening 20, the function of which will be explained below. The valve member 24 includes a hollow valve tube 27 that has openings 29 therein at opposite ends of the valve tube 27. Fuel is permitted to flow through the openings 29 to ensure that fuel pressure is the same throughout the internal portion of the valve 10. The location of the openings 29 ensures that fuel pressure is the same above and below an armature 26 and at an armature gap 31.

The armature 26 is fixed to an end 30 of the valve tube 27. The lift of the armature (static calibration of maximum flow rate) is performed by adjusting the location of the armature 26 with respect to the valve tube 27 and then laser welding the valve tube 27 to the armature 26.

A first spring 32 biases the armature 26 and thus the valve member 24 towards the closed position. A second, lighter force spring 34 is provided between the armature 26 and a cover 28 for dynamic calibration the solenoid valve 14. In particular, the opening time and closing time of the solenoid valve 14 may be calibrated by adjusting the force of spring 34 on the armature 26. This adjustment is made by deforming the cover 28 to load the spring 34 to a desired biasing force on the armature 26. A bottom end of the cover 28 is welded to a pole or stator 38.

An electromagnetic coil 36 generally surrounds at least portions of the armature 26 and the stator 38. The stator 38 is formed of a ferromagnetic material. The stator 38 includes a guide portion 39 that guides the movement of the valve member 24 passing there-through. The electromagnetic coil 36 is powered via an electrical connector 40 and is operable, in the conventional manner, to produce magnetic flux to move the armature 26 towards the stator 38, thereby moving the valve member 24 to the open position and allowing fuel to pass through the fuel outlet opening 20. Deactivation of the electromagnetic coil 36 allows the spring 32 to return the valve member 24 to the closed position against the seating surface 18 and to align itself in the closed position, thereby closing the outlet opening 20, prevent flow of fuel form the solenoid valve 14. The electromagnetic coil is DC operated. The coil 36 and connector 40 are preferably overmolded with plastic and are thus integral with a plastic connector body 42. A housing 44 receives a portion of the connector body 42.

The valve body 16, valve member 24, stator 38, armature 26, and spring 32 can be assembled as a unit and then the spring 34 and cover can be assembled to the unit to define a fuel module. The connector body 42 with coil 36, and the housing, can then be coupled as a power assembly to the fuel module. Thus, the coil 36 or entire power assembly can be manufactured in an area different from the manufacture area of the fuel module. Furthermore, it can be appreciated that the solenoid valve 14 can be assembled and tested in a modular fashion which can reduce scrap. Due to this modular configuration, it is easy to change the length of the solenoid valve 14 and the type of electrical connector body 42.

Returning to FIG. 1, the solenoid valve 14 is placed in within the pump 10 so that an inlet port 46 of the pump 10 communicates with the inlet opening 22 of the solenoid valve 14. The outlet opening 20 of the solenoid valve 14 communicates, when open, with a pump compression area 48. O-rings 50 and 52 (FIG. 2) seal the valve body 16 with respect to the pump 10. A check valve 54 is positioned in an outlet 56 of the pump 10.

Figure 3:
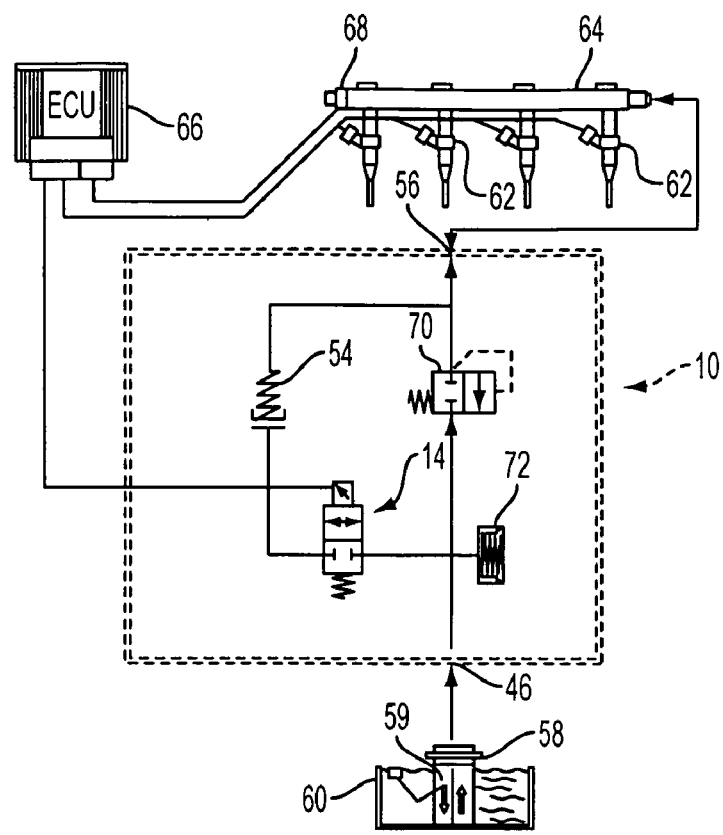
FIG. 3 is a schematic view of the pump with solenoid valve of FIG. 1 in a fuel supply system.
Figure 4:
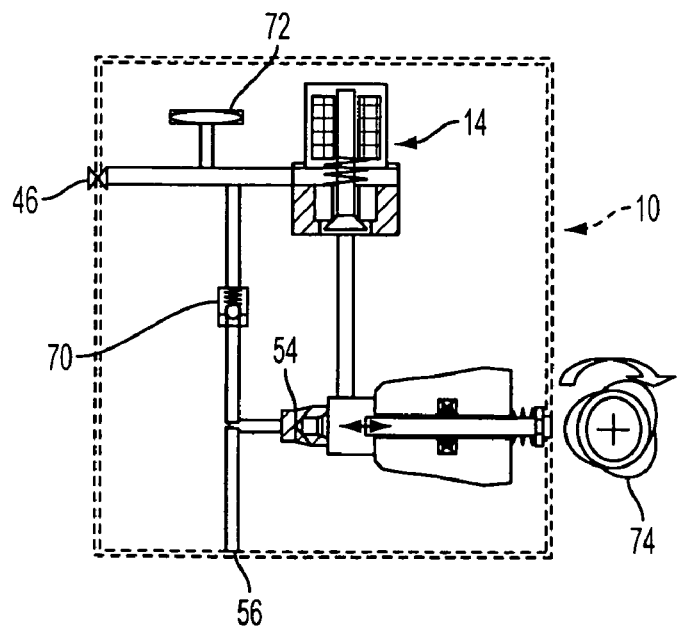
FIG. 4 is a detailed view of the pump with solenoid valve of FIG. 3.

With reference to FIG. 3, the pump 10 with solenoid valve 14 is shown schematically in a fuel delivery system of an automobile. In particular, the fuel delivery system has a fuel supply unit 58 with a low pressure pump 59 in a fuel tank 60. A plurality of fuel injectors 62 is associated with a fuel rail 64. The pump 10 is provided between the fuel supply unit 58 and the fuel rail 64 to provide high pressure fuel to the fuel rail 64. An electronic control unit 66 controls the fuel injectors 62, the solenoid valve 14, and a fuel pressure sensor 68. As shown in FIGS. 3 and 4, the pump 10 includes the solenoid valve 14, the outlet check valve 54, an overpressure valve 70 and a damper 72. As shown in FIG. 4, the pump 10 is associated with camshaft lobes 74 in the conventional manner.

The control of the pump 10 is achieved by allowing fuel to be drawn into the pump 10 through the on/off solenoid valve 14. Without the use of the solenoid valve 14, all fuel sent to the pump 10 would be delivered to the rail 64. To control the flow rate through the pump 10 and thus to reduce the fuel delivery to the rail 64, the solenoid valve 14 is held open during start of the compression stroke of the pump 10, then closed quickly so only the needed fuel is supplied to the rail 64. When the solenoid valve 14 is open during the compression stroke, fuel flows backwards through the solenoid valve 14. When the solenoid valve 14 is allowed to close, the remaining fuel is compressed in the pump 10 and pumped out of the pump 10 past the outlet check valve 54 to the rail 64.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A module solenoid valve for a direct injection, high pressure pump of an automobile fuel delivery system, the solenoid valve comprising:
    a valve body defining an inlet opening and an outlet opening in communication with the inlet opening, the valve body including a seating surface at a distal end thereof,
    a valve member at least partially disposed in the valve body, the valve member having a sealing surface associated with the seating surface,
    a movable armature coupled with the valve member such that movement of the armature moves the valve member between a closed position with the sealing surface engaging the seating surface to prevent fuel from passing through the outlet opening, and an open position with at least a portion of the valve member moving outwardly from the distal end of valve body with the sealing surface being disengaged from the seating surface to permit fuel to pass through the outlet opening,
    a stator associated with the armature,
    a first spring engaged between the armature and stator and constructed and arranged to bias the armature and thus the valve member to the closed position,
    a cover coupled to the stator, the cover being separate from the stator,
    a second spring engaged between the cover and the armature, the second spring being constructed and arranged to provide a biasing force on the armature, with the cover being deformed to adjust the biasing force, and
    an electromagnetic coil associated with the stator and armature for causing movement of the armature towards the stator.

2. The valve of claim 1, wherein the outlet opening is generally transverse with respect to the inlet opening.

3. The valve of claim 1, further comprising an electrical connector in a connector body, the connector being constructed and arranged to power the coil, the connector body overmolding the coil and connector with plastic.

4. The valve of claim 3, wherein the connector body is separate from the valve body.

5. The valve of claim 1, wherein a portion of the cover is laser welded to the stator.

6. The valve of claim 1, wherein the valve member includes a hollow valve tube, the valve tube having openings therein near opposite ends thereof such that fuel may pass through the hollow valve tube and out of the openings to ensure fuel pressure balance in the valve.

7. The valve of claim 6, wherein an end of the valve tube is welded to the armature.

8. The valve of claim 1, in combination with a high-pressure fuel pump, the valve being constructed and arranged to control a flow rate of fuel through the pump.

9. The combination of claim 8, wherein the pump is a single piston pump.

10. A module solenoid valve for a direct injection, high pressure pump of an automobile fuel delivery system, the solenoid valve comprising:
    a valve body defining an inlet opening and an outlet opening in communication with the inlet opening, the valve body including a seating surface at a distal end thereof,
    means, at least partially disposed in the valve body, for controlling flow through outlet opening, the means for controlling flow having a sealing surface associated with the seating surface,
    a movable armature coupled with the means for controlling flow such that movement of the armature moves the means for controlling flow between a closed position with the sealing surface engaging the seating surface to prevent fuel from passing through the outlet opening, and an open position with at least a portion of the means for controlling flow moving outwardly from the distal end of valve body with the sealing surface being disengaged from the seating surface to permit fuel to pass through the outlet opening,
    a stator associated with the armature,
    first means, engaged between the armature and stator, for biasing the armature and thus the valve member to the closed position,
    a cover coupled to the stator, the cover being separate from the stator,
    second means engaged between the cover and the armature for providing a biasing force on the armature, with the cover being deformed to adjust the biasing force, and
    an electromagnetic coil associated with the stator and armature for causing movement of the armature towards the stator.

11. The valve of claim 10, further comprising an electrical connector in a connector body, the connector being constructed and arranged to power the coil, the connector body overmolding the coil and connector with plastic.

12. The valve of claim 11, wherein the connector body is separate from the valve body.

13. The valve of claim 10, wherein the second means is a spring and the cover is deformable to cause adjustment of the biasing force by loading the spring.

14. The valve of claim 10, wherein a portion of the cover is laser welded to the stator.

15. The valve of claim 10, wherein the means for controlling includes a hollow valve tube, the valve tube having openings therein near opposite ends thereof such that fuel may pass through the hollow valve tube and out of the openings to ensure fuel pressure balance in the valve.

16. The valve of claim 15, wherein an end of the valve tube is welded to the armature.

17. The valve of claim 10, in combination with a high-pressure fuel pump, the valve being constructed and arranged to control a flow rate of fuel through the pump.

18. The combination of claim 17, wherein the pump is a single piston pump.

19. A method of assembling a module solenoid valve, the method comprising:
    providing a fuel module comprising:
        a valve body defining an inlet opening and an outlet opening in communication with the inlet opening, the valve body including a seating surface at a distal end thereof,
        a valve member at least partially disposed in the valve body, the valve member having a sealing surface associated with the seating surface,
        a movable armature coupled with the valve member such that movement of the armature moves the valve member between a closed position with the sealing surface engaging the seating surface to prevent fuel from passing through the outlet opening, and an open position with at least a portion of the valve member moving outwardly from the distal end of valve body with the sealing surface being disengaged from the seating surface to permit fuel to pass through the outlet opening,
        a stator associated with the armature,
        a first spring engaged between the armature and the stator and constructed and arranged to bias the armature and thus the valve member to the closed position,
        a cover coupled to the stator, the cover being separate from the stator, and
        a second spring engaged between the cover and the armature, the second spring being constructed and arranged to provide a biasing force on the armature, with the cover being deformed to adjust the biasing force, and
    coupling a power assembly, separate from the fuel module, to the fuel module, the power assembly including an electromagnetic coil associated with the armature and stator for causing movement of the armature towards the stator, and a connector for powering the electromagnetic coil.

\* \* \* \* \*